Jan. 12, 1943.                G. C. FIELDS                2,308,235
                              MIXING VALVE
                           Filed June 10, 1939
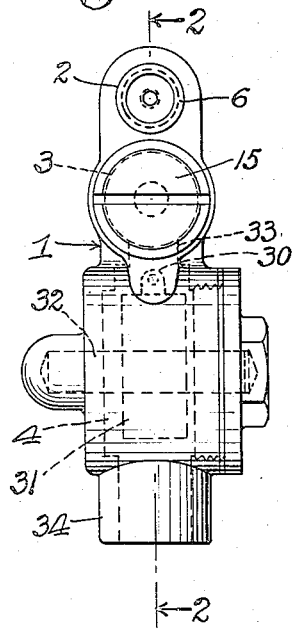
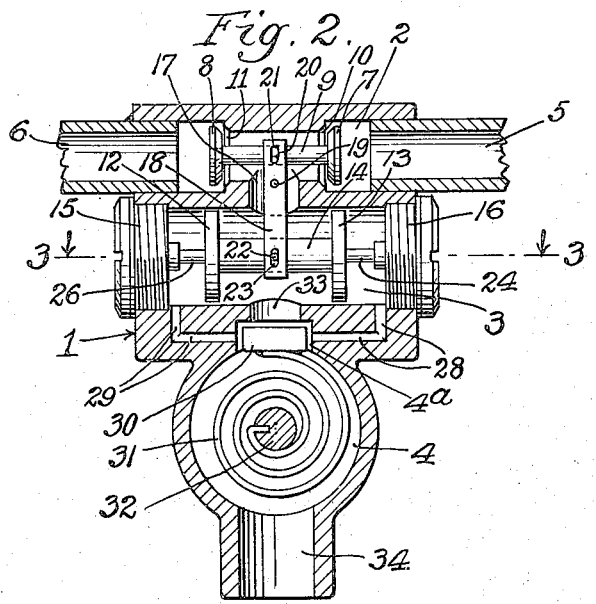
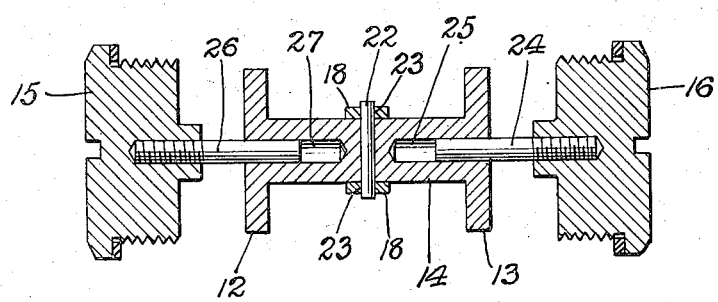
Inventor.
George C. Fields.
by Parker & Carter
Attorneys.

Patented Jan. 12, 1943

2,308,235

UNITED STATES PATENT OFFICE 2,308,235

MIXING VALVE

George C. Fields, South Bend, Ind., assignor to The Dole Valve Company, Chicago, Ill., a corporation of Illinois Application June 10, 1939, Serial No. 278,542

3 Claims. (Cl. 236—12)

This invention relates to mixing valves and has for its object to provide a new and improved device of this description.

The invention has as a further object to provide a valve construction where a thermostat controls the pressure which moves a valve actuating device, the valve actuating device moving the valve. The invention has as a further object to provide a valve construction where a thermostat controls the pressure which moves a valve actuating device, the valve actuating device moving the valve, the valve actuating device and the valve to be moved, being in different chambers.

The invention has as a further object to provide a mixing valve wherein the movement of the valve member is not directly controlled by the thermostat, but is indirectly controlled thereby. The invention has as a further object to provide a mixing valve wherein the movement of the valve member which controls the admission of the hot and cold liquid, is brought about by the liquid itself, so that the thermostat is entirely relieved of the work necessary to move this control valve.

The invention has further objects which are more particularly pointed out in the accompanying description.

Referring now to the drawing,

Fig. 1 is a view of one form of device embodying the invention;

Fig. 2 is a sectional view taken on line 2—2 of of Fig. 1; and

Fig. 3 is a sectional view of the valve actuating member separate from the casing, taken on line 3—3 of Fig. 1.

Like numerals refer to like parts throughout the several figures.

Referring now to the drawing, wherein I have illustrated one form of device embodying the invention, there is shown a valve casing 1 having three chambers, a chamber 2 containing the valve which controls the liquid, a chamber 3 which contains the valve actuating mechanism, and a chamber 4 which contains the thermostat and the valve actuating control member. The chamber 2 has the inlets 5 and 6, one for the cold liquid and one for the hot liquid.

Within the chamber 2 are the controlling valves for the hot and cold liquid, consisting of the valve members 7 and 8 connected together by the connecting piece 9. The valve member 7 controls the valve port 10 and the valve member 8 controls the valve port 11. Located within the chamber 3 are the pistons 12 and 13, which are connected together by the connecting member 14 and which loosely fit in the chamber so that the liquid may pass by these pistons. The ends of the chamber 3 are closed by the closing members 15 and 16. Chambers 2 and 3 are connected by the opening 17. The valve members 7 and 8 are connected to the valve actuating mechanism by means of a power transmitting member 18 which extends through the opening 17 and which is pivoted at 19 to the casing. There are preferably two of the power transmitting members 18. There is a pin 22 passing through the connecting member 14 which projects from the opposite sides thereof and which is received in the elongated slots 23 in the power transmitting member 18, see Fig. 3. There is a pin 20 extending through the connecting piece 9 and which is received in an elongated slot 21 in the power transmitting member, the construction being similar to that shown in Fig. 3. The closing member 16 is provided with a projection 24 which fits into a recess 25 in the connecting member 14. The closing member 15 is provided with a projection 26 which fits into a recess 27 in the connecting member 14. There is a passageway 28 in the casing having one end communicating with the chamber 3 between the piston 13 and the closing member 16, the other end communicating with the part 4a of the chamber 4. There is a passageway 29 which has one end communicating with the chamber 3 between the piston 12 and the closing member 15, the other end communicating with the part 4a of the chamber 4. Within the part 4a of the chamber 4 is a member 30 which is a control member for the valve actuating mechanism.

This control member 30 is connected to one end of the thermostat 31, the other end of the thermostat being connected to the part 32 fixed to the casing. There is an opening 33 which connects the chamber 3 with the part 4a of the chamber 4 and the chamber 4. The casing has an outlet 34 through which the mixed liquid is discharged.

The use and operation of my invention are as follows.

If, for example, the hot liquid enters the inlet 6 and the cold liquid the inlet 5, the two liquids pass through the ports 10 and 11 and through the opening 17 and into the chamber 3 and through the opening 33 into the chamber 4, so as to surround the thermostat. If now, the temperature of the liquid becomes lower than that for which the device is set, the thermostat moves the control member 30 to close or partially close the passageway 29. This builds up a pressure between the piston 12 and the closing member 15 and this pressure moves the pistons 12 and 13 to the right. This moves the lower end of the power transmitting member 18 to the right and the upper end to the left, thereby moving the valve member 7 to reduce the size of the port 10 and increase the size of the port 11. This reduces the amount of cold liquid and increases the amount of hot liquid entering the chamber 3 and the chamber 4. The liquid in chamber 4 is then raised in temperature and the thermostat moves the control member 30 to the right, that is, back to the normal position it occupies to maintain the temperature for which the device is set. This relieves the pressure between the piston 12 and the closing member 15 and produces a balanced condition in chamber 3.

If the temperature of the liquid surrounding the thermostat rises above that for which the device is set, the thermostat acts to move the control member 30 to the right to partially close the passageway 28. This increases the pressure in passageway 28 and the space between the piston 13 and the closing member 16. This causes the pistons 12 and 13 to be moved to the left, causing the lower end of the power transmitting member 18 to be moved to the left and the upper end of the power transmitting member to be moved to the right. This increases the area of the port 10 and decreases the area of the port 11, so that the amount of cold liquid is increased and the amount of hot liquid is decreased. The hot and cold liquids are then mixed and enter the chamber 4 and surround the thermostat, and when the temperature of the mixed liquid reaches that for which the device is set, the control member 30 is moved back to its initial position.

It will be noted that in this device there is no increase in power or work required of the thermostat as the device, the movement of which it controls, increases in size or weight. In other words, a piece of bimetal having very little strength can cause the movement of large devices, the movement of which requires great force.

I claim:

1. A mixing valve comprising a casing having three chambers, one chamber having inlets for the two fluids, a valve member in said chamber for controlling said inlets, a second chamber at one side of and substantially parallel to said first chamber, a valve actuating mechanism in the second chamber, said first and second chamber separated by a wall common to both chambers, said wall having an opening therein through which liquid passes from the first chamber to the second chamber, a connecting member extending through said opening and connected with said valve actuating mechanism and with said valve member, a third chamber, a thermostat in said third chamber, and means associated with said thermostat for controlling said valve actuating mechanism, to cause it to move said valve member to control said inlets.

2. A mixing valve comprising a casing, a chamber therein having two inlets for the hot and cold liquids, two valve members in said chamber connected together, seats for said valve members, means for moving said valve members simultaneously to move one valve member toward its seat and the other away from its seat, said casing having a second chamber, a valve actuating mechanism in said second chamber, connected with said valve members, so as to move them simultaneously, and means responsive to temperature, for causing said valve actuating mechanism to move said valve members to and from their seats, said valve actuating mechanism comprising two pistons connected together, a connection between the first and second chambers intermediate the two valves in the first chamber and intermediate the two pistons in the second chamber, a third chamber containing the temperature responsive means, and a connection between the second chamber and the third chamber intermediate the two pistons in the second chamber.

3. A mixing valve comprising a casing having two inlets, one for the hot and the other for the cold liquid, a chamber into which said liquids are received, two movable valve members in said chamber for controlling said liquids, said valve members fixed with relation to each other, two separated fixed ports controlled by said valve members, valve actuating mechanism pivotally connected with said valve members, a chamber in which said valve actuating mechanism is received, said two chambers connected together by an opening, a connecting member extending through said opening and connected with said valve members and said valve actuating mechanism, said opening acting also to conduct the liquid from the valve chamber to the valve actuating mechanism chamber, means for utilizing the pressure of the liquid for moving said valve actuating mechanism and said valve members, and a controlling device responsive to temperature, for controlling the movement of said valve actuating mechanism, a chamber for said controlling device, an opening connecting said latter chamber with the actuating mechanism chamber, through which liquid passes to the chamber of the controlling device.

GEORGE C. FIELDS.